Jan. 10, 1967  J. M. ADAMSON  3,297,204
BUNKER CONVEYORS
Filed July 12, 1965  4 Sheets-Sheet 1
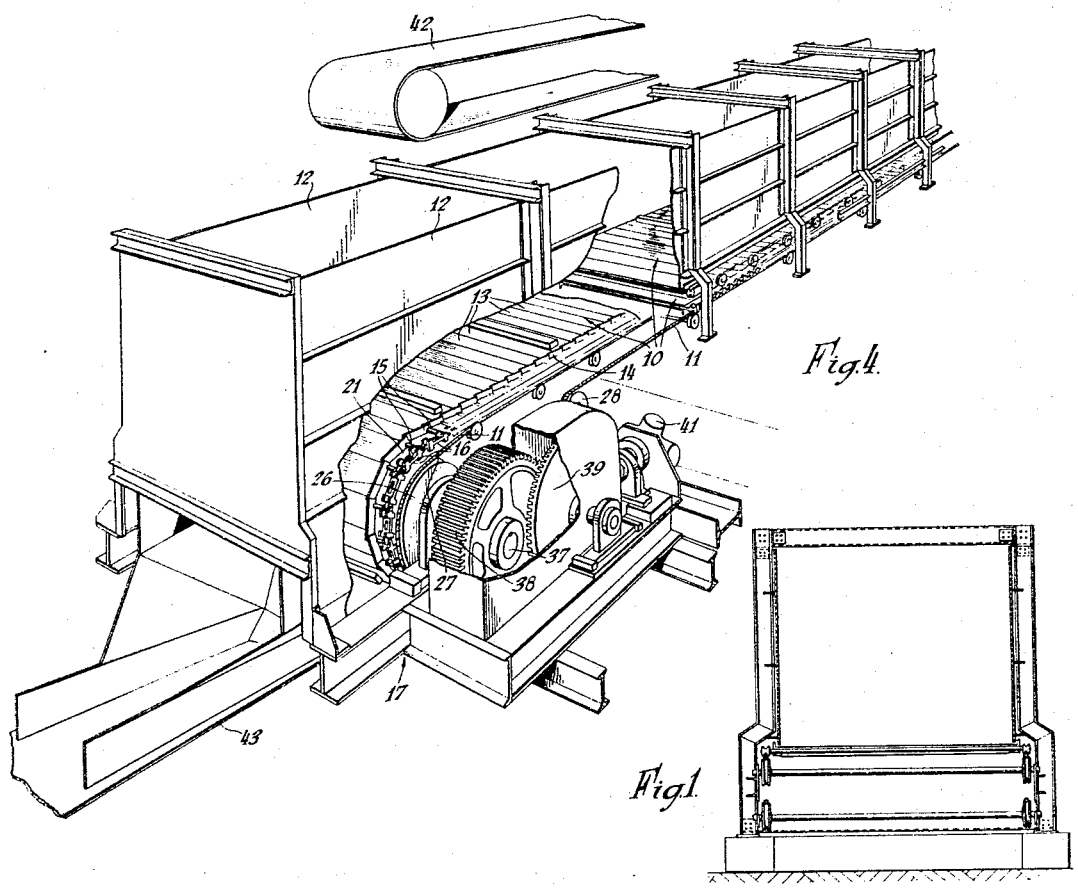
INVENTOR
James M. Adamson Jan. 10, 1967  J. M. ADAMSON  3,297,204
BUNKER CONVEYORS
Filed July 12, 1965  4 Sheets-Sheet 2
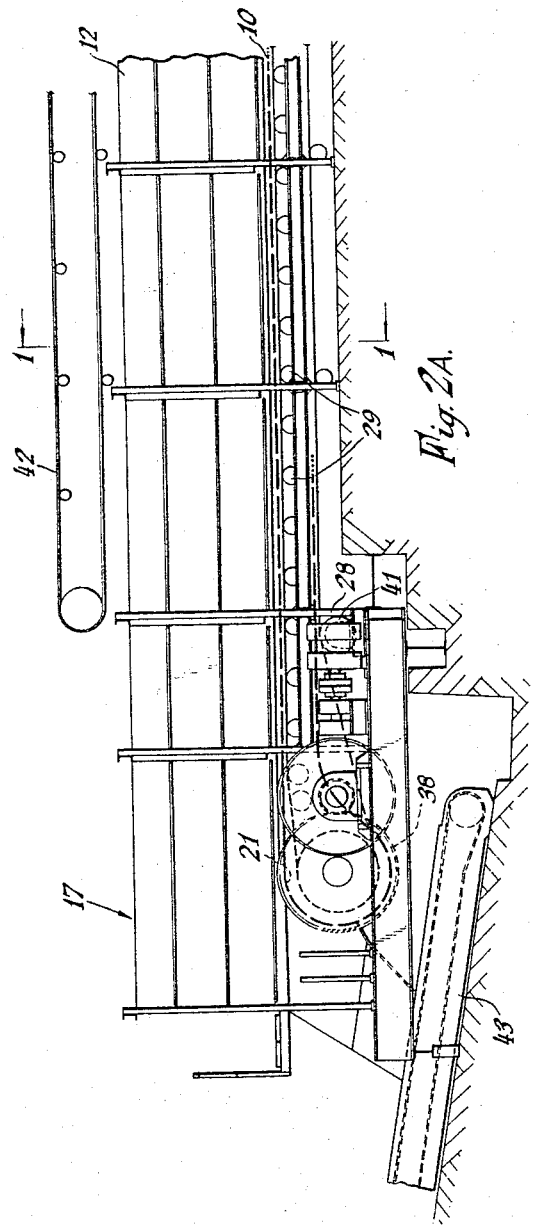
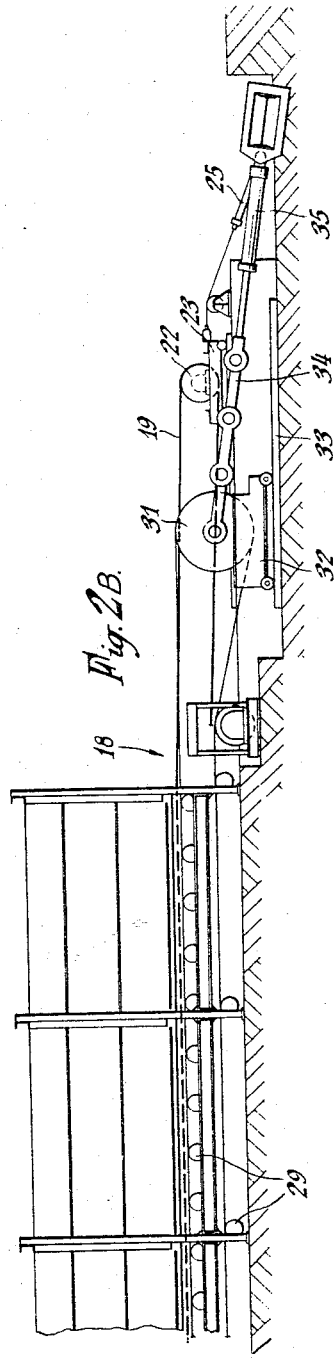
INVENTOR
James M. Adamson Jan. 10, 1967  J. M. ADAMSON  3,297,204
BUNKER CONVEYORS
Filed July 12, 1965  4 Sheets-Sheet 3
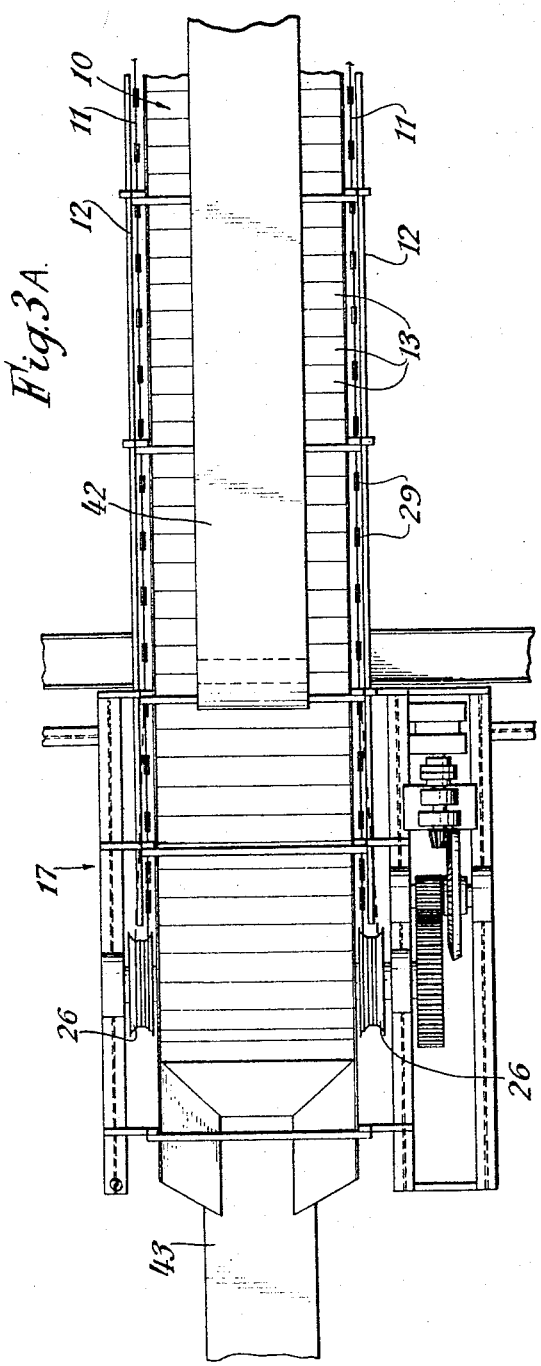
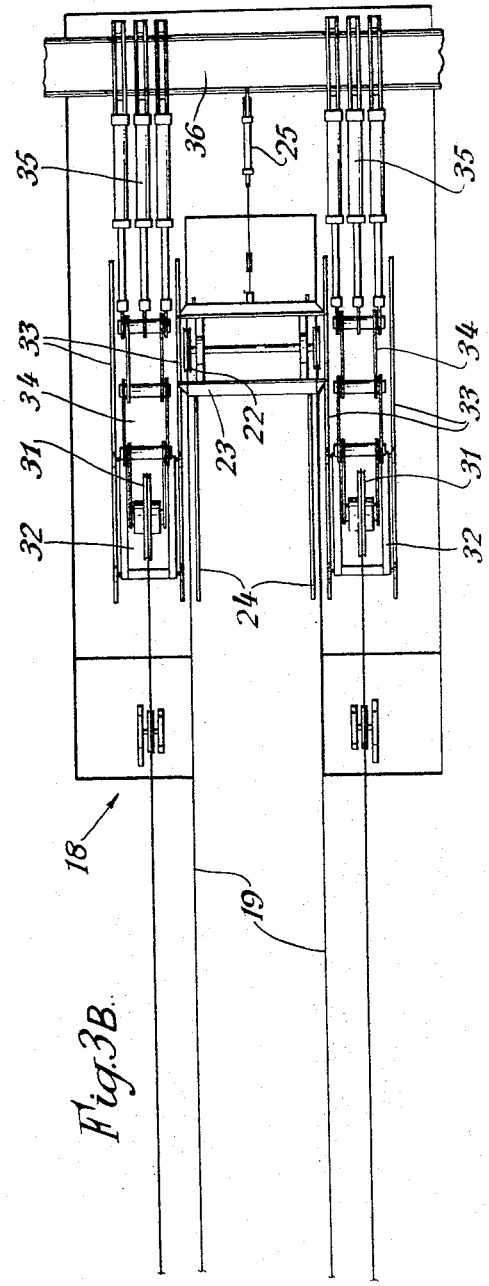
INVENTOR
James M. Adamson Jan. 10, 1967  J. M. ADAMSON  3,297,204
BUNKER CONVEYORS
Filed July 12, 1965  4 Sheets-Sheet 4

INVENTOR
James M. Adamson

United States Patent Office 3,297,204
Patented Jan. 10, 1967

3,297,204
BUNKER CONVEYORS
James M. Adamson, Inverness, Scotland, assignor to Cable Belt Limited, Inverness, Scotland, a British company
Filed July 12, 1965, Ser. No. 471,103
Claims priority, application Japan, Sept. 1, 1964, 39/50,169
4 Claims. (Cl. 222—55)

This invention relates to bunker conveyors. A bunker conveyor has for its purpose to provide temporary storage of material, such as coal or other mineral, between a supply point and a receiving point so that if the rate of supply differs from the rate at which the material is required at the delivery point material may be stored in or taken from the bunker conveyor to give the required delivery rate.

The bunker conveyor comprises a belt conveyor mounted between upstanding side walls which provide lateral support for material on the belt and thus enable a great depth of material to be supported. A feeder conveyor deposits material at one end of the bunker conveyor, and a receiving conveyor receives material from the same end of the bunker conveyor. Thus, if the belt of the bunker conveyor is stationary, material passes directly from the feeder conveyor to the receiving conveyor, but if the belt of the bunker conveyor is moving so as to carry material away from the end at which it receives the material, some or all of the material is collected on the bunker conveyor belt and the supply to the receiving conveyor is reduced or stopped. Conversely, if the bunker conveyor belt, having material stored on it, is driven in the opposite direction, material is delivered from it to the receiving conveyor, thus maintaining the required rate of delivery if the feeder conveyor is supplying insufficient material or none at all.

It is the object of the present invention to provide an improved bunker conveyor which is reliable in operation and is economical to produce and operate.

A bunker conveyor according to the present invention comprises a reversible plate belt mounted between upstanding side walls which provide lateral support for material on said belt, said belt comprising pivotally linked plate elements having shoe members resting on ropes forming loops one on each side of the conveyor, and means for driving said ropes to effect movement of said plate belt, the length of the plate belt being substantially equal to the distance between the head and tail ends of the conveyor and the ends of said plate belt being connected one to the other by one or more flexible tension members so that said plate belt and tension members form together a closed loop passing over rotary guide members at the ends of the conveyor.

Preferably, tensioning means are provided for the rope loops, the tensioning load applied by said tensioning means being variable to enable different tensions to be applied to the ropes when the conveyor is moving in opposite directions.

The invention is hereinafter described with reference to the accompanying drawings, in which:

FIGURE 1 is a transverse sectional elevation of one form of bunker conveyor according to the invention;

FIGURES 2A and 2B are side elevations of the two ends of the conveyor, on a smaller scale than FIGURE 1, the central part of the conveyor being omitted;

FIGURES 3A and 3B are plan views, on the same scale as FIGURE 2 of the corresponding parts of the conveyor;

FIGURE 4 is a perspective view of the head end of the bunker conveyor, with part of the conveyor casing broken away, the view showing the conveyor driving mechanism and parts of feeder and receiving conveyors associated with the bunker conveyor.

Figure 5:
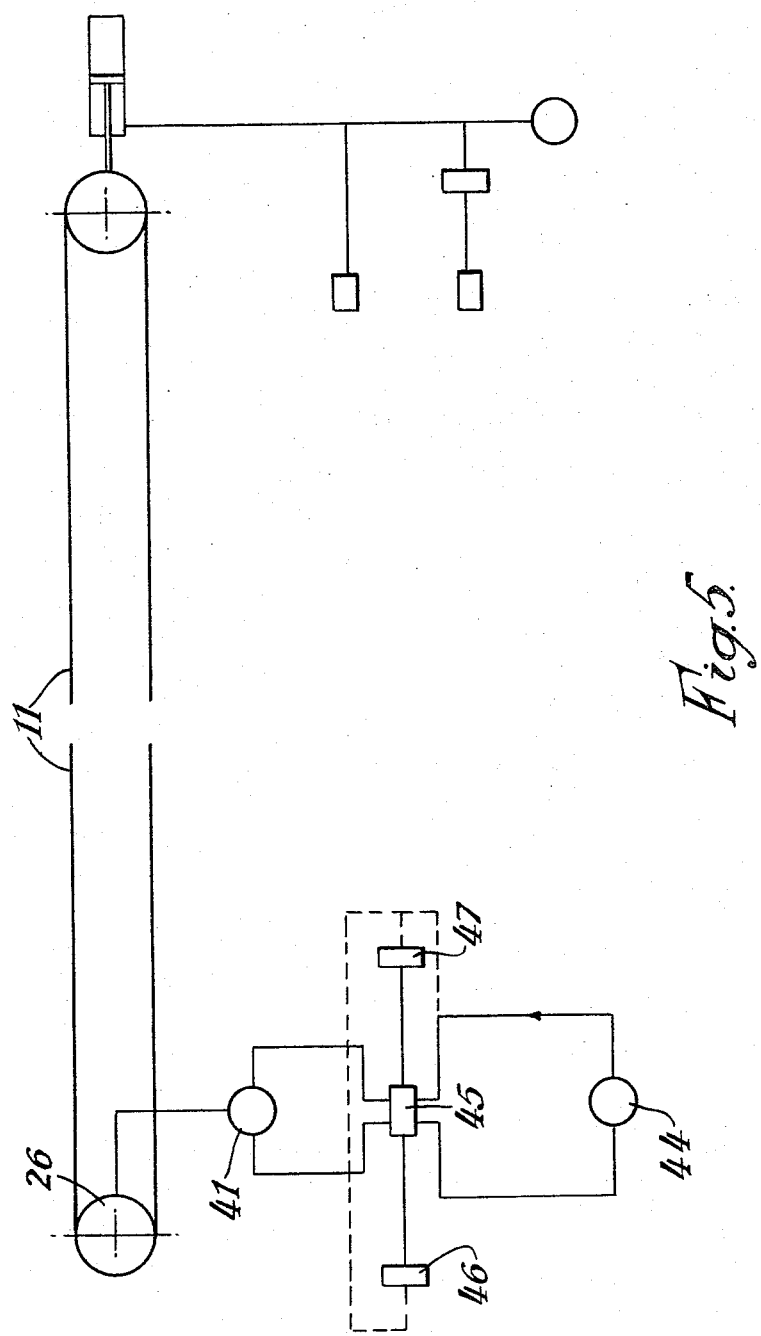
FIGURE 5 is a diagram showing control apparatus for the conveyor.

Referring to the drawings, the bunker conveyor comprises a plate belt 10 supported and driven by rope loops 11 one on each side of the said belt and mounted between upstanding fixed walls 12. The plate belt 10 comprises a series of plate elements 13 having upstanding end walls 14. The lower edges of the fixed walls 12 overlap, on the inside, the upstanding end walls 14 of the elements 13. The plate elements 13 have welded to their undersides, at their leading and trailing edges, lengths of metal tubing 15 so arranged that the lengths of tubing on the meeting edges of any two adjacent elements form a hinge barrel to receive a transverse hinge pin coupling the said elements together. The hinge barrel extends laterally to the shoe elements 16, and the hinge pins extend laterally beyond the hinge barrel to support the shoe elements 16 (FIGURE 4) which are grooved to rest on and frictionally grip the ropes forming the loops 11. The tubing 15, hinge pins and supporting shoe elements 16 have been omitted from FIGURE 2 to avoid obscuring other parts.

The total length of the series of plate elements is approximately equal to the distance between the head end 17 and the tail end 18 of the conveyor, and one or more tension elements such as the two ropes 19 (FIGURES 2 and 3) secured to the end elements of the series combine with said elements to form a closed loop. At the head end 17 of the conveyor there is provided an end drum 21, and at the tail end 18 there are provided a pair of pulleys 22, the closed loop constituted by the plate elements and the ropes 19 passing around said end drum and pulleys. The pulleys 22 are mounted on a wheeled carriage 23 running on rails 24, a pull being applied to the carriage 23 by a liquid pressure ram-and-cylinder device 25 to tension the said loop.

The ropes forming the rope loops 11, at the head end of the conveyor, pass around driving wheels 26 coaxial with the end drum 21, the driving wheels being surge wheels about which the ropes are wrapped several times, the said surge wheels being of smaller diameter than the end drum 21, so that the ropes forming the rope loops 11 are led away from the upper run of the belt as shown at 27 (in FIGURE 4), are led off the surge wheels at a wider spacing than their normal spacing where they are engaged by the belt, and are led back over idler pulleys 28 to their normal spacing on the lower run. The belt 10 passes between the more widely spaced parts of the ropes and the shoes re-engage on the upper sides of the said ropes as the said ropes leave the idler pulleys 28. The ropes, on both upper and lower runs are supported at intervals by stand pulleys 29, and, at the tail end 18 of the conveyor pass around tension pulleys 31 mounted on wheeled carriages 32 running on rails 33, the carriages 32 being linked by chains 34 to banks of liquid pressure ram-and-cylinder devices 35 anchored to a fixed beam 36, so that liquid pressure acting on the said devices 35 tensions the rope loops. The rope loops 11, instead of being formed by separate ropes, may comprise a single rope which is guided to pass from one side of the conveyor to the other at a suitable place.

The surge wheels 26 are mounted on a shaft 37 on which is also mounted a spur gear wheel 38 driven through reduction gearing 39 by a rotary liquid pressure motor 41 (FIGURES 4 and 5) to which liquid under pressure is supplied by a variable delivery pump 44 through a flow reversing valve 45 which is operable to reverse the direction in which the motor 41 is driven by liquid from the pump 44. The conveyor can thus be driven in either direction as required. The reversing valve 45 is operated by liquid pressure through a pair of solenoid operated valves 46 and 47.

Another liquid pressure pump 48 is coupled to the driving rope tensioning ram-and-cylinder devices 35 to produce the rope tensioning load therein. Two relief valves 49 and 51 are connected between the pump 48 and the devices 35, the relief valve 49 opening at a higher pressure than the relief valve 51 and a shut-off valve 52, controlled by a solenoid, being operable to close off the connections to the relief valve 51. The solenoid controlling the shut-off valve 52, and the solenoids controlling the valves 46 and 47 operating the reversing valve 45 are all connected in a common electric circuit controllable by switches so that an operator can reverse the direction of the conveyor travel and, at the same time change the tension load on the driving and supporting ropes by opening or closing the lower pressure relief valve 51 and so changing the pressure in the devices 35.

The ram-and-cylinder devices 25 which tension the belt loop may be supplied with liquid under pressure by a third pump (not shown).

It will be apparent that, when the bunker conveyor is being loaded, and the belt is moving away from the head end of the conveyor on the upper run, the driving wheels 26 are pulling the ropes from the lower run on to the upper run and the tension on the said ropes on the upper run due to the driving pull is a minimum, so that, to maintain the desired total tension for supporting the load, a maximum pull must be exerted by the ram-and-cylinder devices 35. On the other hand, when the bunker conveyor belt is being unloaded, the driving wheels 26 are applying direct tension to the upper runs of the driving ropes, and a lesser pull applied by the ram-and-cylinder devices will suffice to provide the required total tension. Since the use of unnecessarily high rope tension involves the use of larger ropes, necessitating larger surge wheels and bigger gearing, and also increases the driving power and wear of the conveyor mechanism, it is advantageous to provide for change in the tension applied by the devices 35 when the conveyor is reversed.

Material is fed on to the bunker conveyor belt 10 close to the head end 17 by a feeder conveyor shown diagrammatically at 42 in FIGURE 4, and material is taken away from the bunker conveyor by a receiving conveyor shown diagrammatically at 43. If the bunker conveyor belt 10 is stationary, material fed on to it by the feeder conveyor 42 passes over the part of the belt 10 on the end drum 21 directly on to the receiving conveyor 43. If the bunker conveyor is running with the belt 10 moving away from the head end of the conveyor on the upper run, material fed by the feeder conveyor is carried onto the bunker for storage, and if the bunker conveyor is running with the belt 10 moving in the opposite direction, material from the said bunker conveyor is transferred to the receiving conveyor. Thus, the rate at which material is taken away by the receiving conveyor can be the same as, more than, or less than the rate at which it is brought in by the feeder conveyor, depending on the direction in which, and the speed at which, the bunker conveyor belt 10 is driven.

The use of a plate belt 10 which is of substantially the same length as the distance between the head and tail ends of the conveyor, and the use of ropes to complete the loop of which it forms a part is made possible by the fact that the conveyor receives and delivers material at the same end, and does not run continuously in one direction. This reduces the complexity and weight of the conveyor, and leads to economy in both manufacturing and running costs.

The use of rope-supported plate elements facilitates the use of such elements to form only part of the complete belt loop, because, since much of the traction load is taken by the frictional grip between the shoes and the ropes, only a part of the load has to be supported by the ropes forming part of the said belt loop.

I claim:

1. A bunker conveyor comprising a housing, a plate belt mounted for reciprocal movement in said housing, an endless rope in frictional engagement with said belt to drive same, means to drive said rope in opposite directions, and means to vary the tension in said rope according to the desired direction of travel.

2. The conveyor of claim 1 wherein said belt comprises a plurality of pivotally linked plate elements.

3. The conveyor of claim 1 wherein said belt is connected at its end by at least one tensioning element to form a closed loop and further comprising means to vary the tension on said loop.

4. The conveyor of claim 3 wherein each of said means to vary tension comprises a liquid ram and cylinder device.

References Cited by the Examiner
UNITED STATES PATENTS 2,572,325 10/1951 Ernst _____ 198—110 X
3,036,737 5/1962 King et al. _____ 222—55

ROBERT B. REEVES, Primary Examiner.

HADD S. LANE, Examiner.